April 17, 1945.   J. B. STEWART   2,373,791
ROTARY ENGINE
Filed Oct. 9, 1943   2 Sheets-Sheet 1

INVENTOR
JOHN BRUCE STEWART
BY Rodney Bedell
ATTORNEY

April 17, 1945. J. B. STEWART 2,373,791
ROTARY ENGINE
Filed Oct. 9, 1943 2 Sheets-Sheet 2

INVENTOR
JOHN BRUCE STEWART
BY Rodney Bedell
ATTORNEY

Patented Apr. 17, 1945

2,373,791

UNITED STATES PATENT OFFICE 2,373,791

ROTARY ENGINE

John Bruce Stewart, St. Louis, Mo.

Application October 9, 1943, Serial No. 505,627

21 Claims. (Cl. 123—11)

The invention relates to engines involving relatively movable rotors in a circular cylinder structure whereby fluid alternately compressed and expanded between the rotors serves to drive a power shaft or whereby a driven power shaft drives the rotors to draw in and discharge fluid between them. The invention may be embodied, for example, in an internal combustion engine, in a steam or compressed air engine, or in a compressor or pump for air, water or other fluid.

One object of the invention is to provide a rotary engine of the type described of relatively few parts, all rotating in the same direction and in themselves producing desired absolute pressures on fluids in the cylinder structure and coacting so as to render the engine effective, particularly at high speeds.

Another object is to provide a rotary engine of the type described free of ratchets and pawls and free of spring actuated parts, thereby reducing expense of construction and maintenance and wear incident to wear and replacement of such parts.

A more specific object of the invention is to transfer momentum from one moving rotor to another moving rotor, thus reducing or eliminating the loss of energy resulting in rotary engines in which one rotor is brought to a stop before the other rotor begins to move.

Rotary engines may comprise means for successively and alternately locking the rotors to the cylinder and shaft respectively. Another object is to effect in such engines the locking of the rotors to the cylinder and shaft respectively through cushioned means, thereby freeing the mechanism of repeated shocks from abrupt stopping of the rotors. This object may be obtained by using magnetism for locking the rotors to the cylinder and shaft respectively, and it is another object to utilize electromagnets controlled by the rotation of the engine parts to secure the rotors to the shaft and frame respectively intermittently for effecting a continuous delivery of power by the engine.

Another object is to balance the parts and their power impulses so as to provide for smooth operation of the engine.

These and other detail objects of the invention are attained by the structure shown in the accompanying drawings in which—

Figure 4:
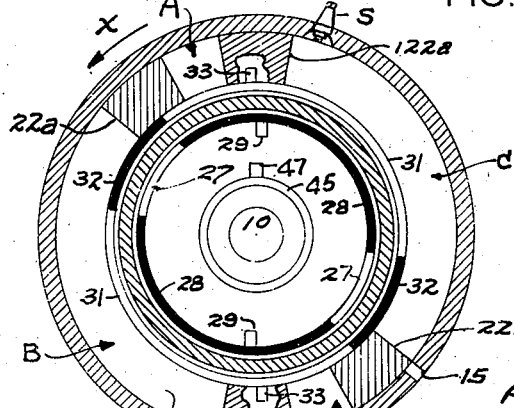
Figure 4 is a transverse section taken on the line 4—4 of Figure 1 but largely diagrammatic and drawn to a smaller scale and showing the rotor pistons in the positions assumed at one point in the cycle of operations and also indicating the positions of the magnet circuit controls on one rotor.
Figure 5:
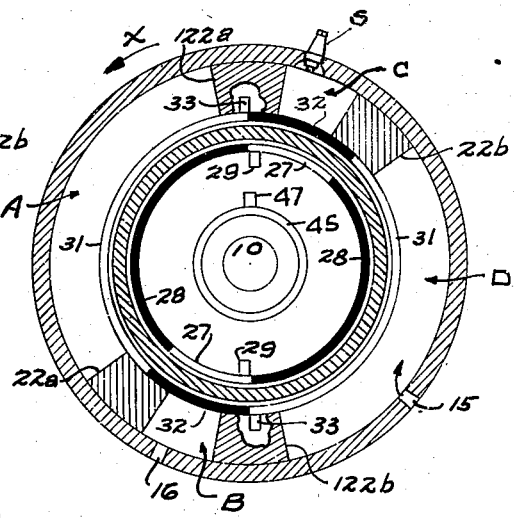
Figure 6:
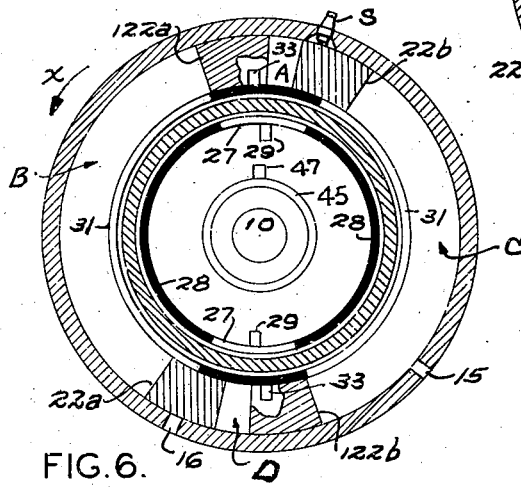

Figures 5 and 6 correspond to Figure 4 but illustrate the parts in successive positions assumed during the cycle of operation of the engine.

The engine frame is built up and comprises a central ring 1, side plates 2 and 3 and end bells or housings 4 and 5. Ring 1 and plates 2 and 3 form a continuous inwardly facing peripheral cylinder 13. A substantially continuous water jacket 14 extends around three sides of cylinder 13 and cooling water is circulated through this water jacket in any well known manner. A port 15 (Figures 2, 4–6) provides for the intake of fuel to cylinder 13 and a port 16 provides for the exhaust of the products of combustion from the cylinder.

Antifriction bearing units 6 and 7 are mounted in housings 4 and 5 respectively and journal a shaft 10 which in turn carries antifriction bearing units 11 and 12 which journal rotors 20 and 120 respectively, each having an annular rim 21 and 121 respectively, extending parallel to the shaft, and each rotor has a pair of radially extending pistons 22a, 22b and 122a, 122b respectively received in cylinder 13 and corresponding in cross section to the cross section of the cylinder. The inner open side of the cylinder between successive pistons is closed by the periphery of rotor rims 21 and 121. Suitable packing elements P are provided to seal the joints between the cylinder and rotors.

As so far described, the two rotors and shaft are rotatable relative to each other and to the frame which may be assumed as remaining stationary. The following structure provides means for securing the rotors to the shaft and to the frame intermittently. In the operation, each rotor is secured to the shaft and to the frame alternately and while one rotor is secured to the shaft the other rotor is secured to the frame. The means securing the rotors as mentioned comprises a series of devices utilizing magnetism controlled by electric circuits which, in turn, are opened and closed by the rotation of the rotors about the shaft axis. The term "secured" is intended to express the relation existing between mutually attracted parts although during a portion of each "securing" period there will be relative movement of those parts prior to the synchronizing or unitary action of those parts.

Structurally the securing means for each rotor may be considered independent of the securing means for the other rotor and the securing means for rotor 20 will be described in detail, it being understood that these means are duplicated for rotor 120 and that the same reference numerals with the hundreds digit added apply to the parts on rotor 120. A collar 41 is keyed to shaft 10 at K and on its external surface is fixed a series of electromagnets comprising successive cores 42 having coils 43 wound in opposite directions about successive cores forming the alternating north and south magnetic poles.

A series of cooperating magnets is fixed upon the inner periphery of rotor rim 21. The cores or poles of these magnets are indicated at 23 and their windings at 24.

A corresponding series of magnets is fixed upon the outer periphery of rotor rim 21 and the cores of these magnets are indicated at 25 and their windings at 26. Cooperating magnets are fixed on the inner periphery of housing 4 and the cores of these magnets are indicated at 17 and their windings at 18.

Mounted on shaft 10 is a collector ring 45 having a continuous circuit forming periphery. A stationary brush 47 on housing 4 engages ring 45.

A ring mounted on the inner periphery of rotor rim 21 comprises two circuit forming segments 27 diametrically opposite each other and each extending approximately 43° and alternating with insulation segments 28, each extending approximately 137°. Stationary brushes 29 on housing 4 engage segments 27 and 28.

A ring mounted on the exterior periphery of rotor rim 21 comprises two circuit forming segments 31 each extending approximately 137° and alternating with insulation segments 32 each extending approximately 43°. Stationary brushes 33 on housing 4 engage segments 31 and 32.

Figure 1:
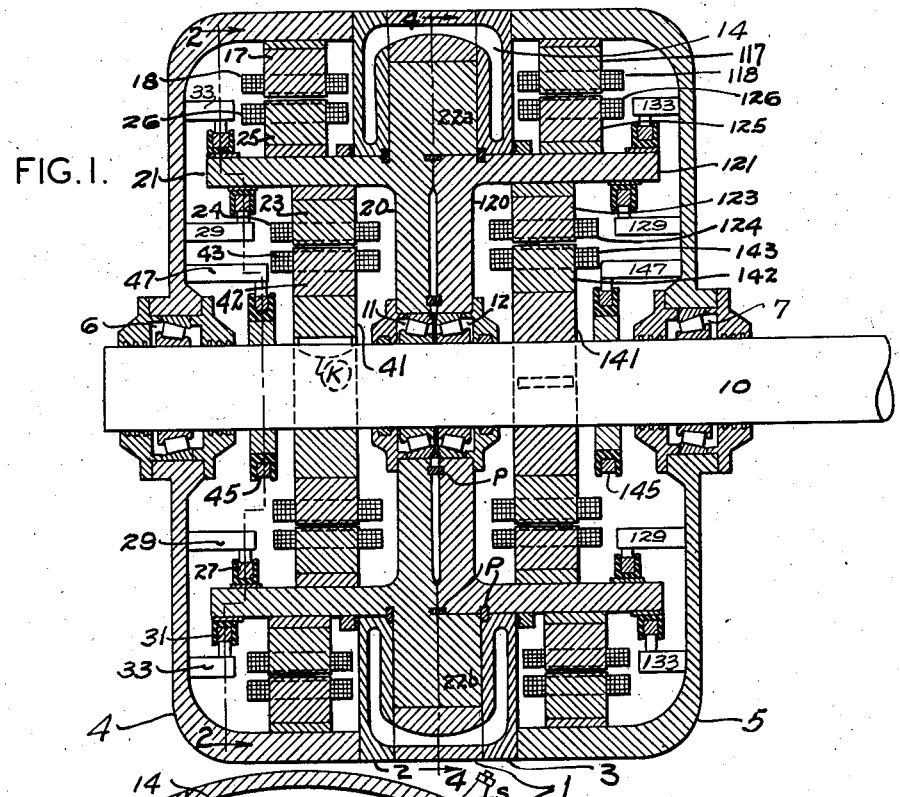
Figure 1 is a section taken through an internal combustion rotary engine on a plane extending longitudinally of its axis.
Figure 2:
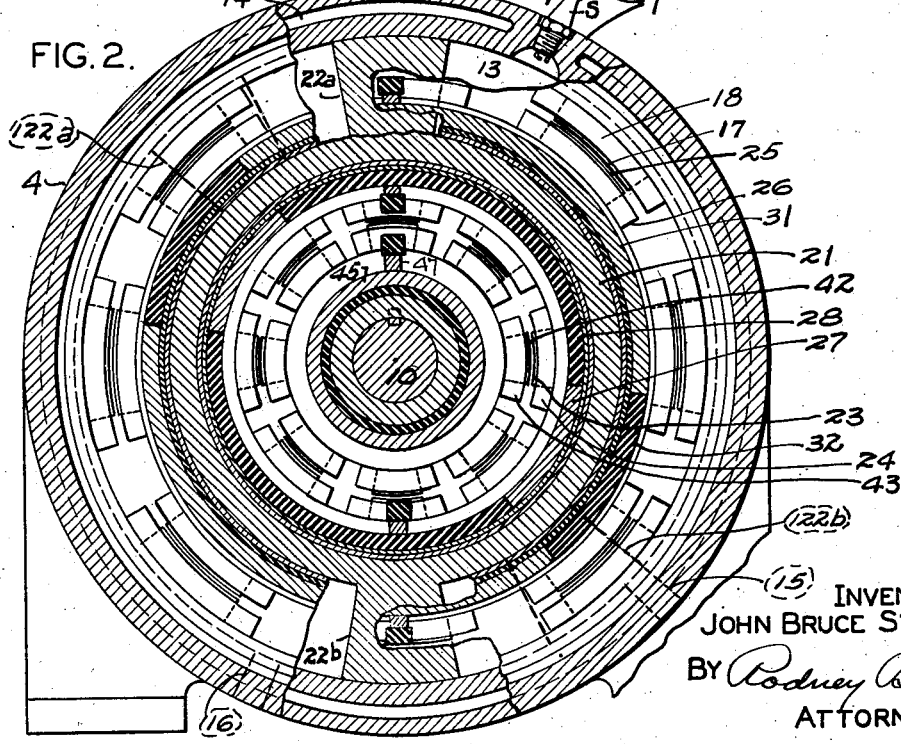
Figure 2 is a transverse section taken on the line 2—2 of Figure 1.
Figure 3:
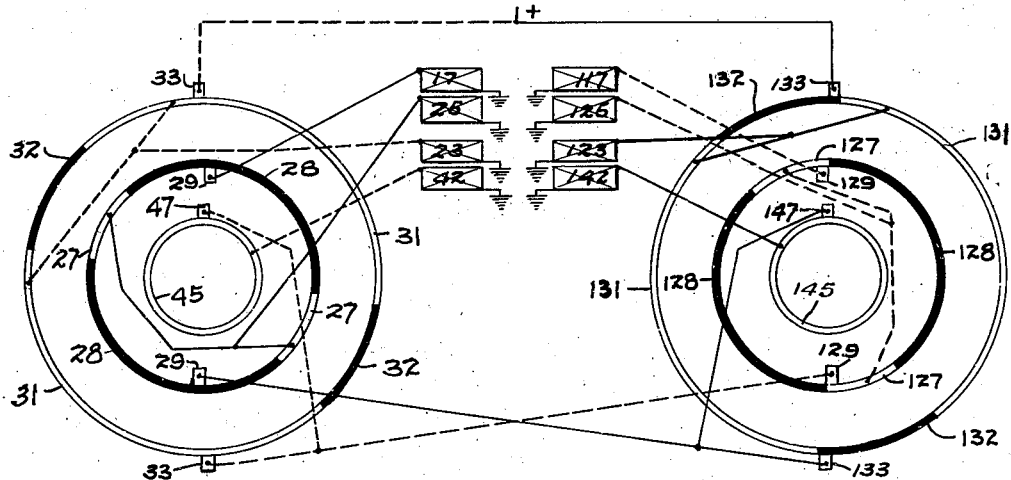
Figure 3 is a wiring diagram of the electromagnetic circuits.

The wiring diagram (Figure 3, showing the rings in the position indicated in Figure 4) indicates that the windings of frame magnets 17 and cooperating outer magnets 25 on rotor 20 are in the same circuit as the windings of shaft magnets 142 and cooperating inner magnets 123 on rotor 120 and, conversely, that frame magnets 117 and cooperating outer magnets 125 on rotor 120 are in the same circuit as shaft magnets 42 and cooperating inner magnets 23 on rotor 20. Hence, when one rotor is secured to the frame, the other rotor will be secured to the shaft and vice versa.

*Operation.*—With the above structural description in mind, the operation of the engine should be readily understood by reference to the following description of critical successive positions of the rotors, reference being had to Figures 4–6, it being understood that the rotors are turning in an anticlockwise direction as indicated by the arrow X. Magnets 117 and 125 are energized and rotor 120 may be considered stationary. Magnets 23 and 42 are also energized and are securing rotor 20 to the shaft. The fuel charge in chamber A between piston 122a and piston 22a has been ignited and is expanding, delivering a driving impulse to piston 22a and accelerating the movement of the same and rotor 20 and the shaft. Gas in chamber B between the forward side of piston 22a and the rear face of piston 122b on rotor 120 is being exhausted through exhaust port 16 and another charge of fuel in chamber C between the rear face of piston 122a and the forward face of piston 22b is being compressed and, as soon as piston 22b passes intake port 15, another charge of fuel is drawn through the intake port into chamber D between the rear face of piston 22b and the forward face of piston 122b. (See Figure 5.)

When the parts reach the position shown in Figure 5, the driving impulse from the ignited expanding fuel will have been absorbed and further rotation of the shaft and rotor 20 as a unit would cause the rotor to exert a drag upon the shaft. At this point, however, insulation segments 32 interrupt the current to magnets 23 and 42, deenergizing the same and leaving shaft 10 and rotor 20 free to rotate independently of each other. The momentum of piston 22b causes it to further compress the charge in chamber C. At the same time, insulation segments 32 and 128 interrupt the current to magnets 117 and 125 holding rotor 120 to the frame, deenergizing the same, and rotor 120 is free to move under the thrust exerted upon the rear face of its piston 122a by the compressed fuel charge in chamber C. Also collector segments 131 contact their brushes and magnets 123 and 142 are energized, whereby rotor 120 is attracted to the shaft just as rotor 20 was secured at the beginning of the operation being described. As rotor 20 decelerates and rotor 120 accelerates, the piston 22b approaches piston 122a more closely than at any other point in the cycle (see Figure 6) and just prior to the instant of their closest approach, rotor 20 closes the circuit for the spark plug S, igniting the charge and subjecting piston 122a and rotor 120 to a driving impulse corresponding to that just described for rotor 20. Thereupon piston 22b assumes the position occupied by piston 122a in Figure 4, rotor 20 is locked to the frame and rotor 120 and its pistons exhaust the gas from the previous explosion, compress the fuel charge for the next explosion and draw in the fuel charge for the following explosion.

During the movement of the rotors from the position shown in Figure 5 to the position shown in Figure 6, the momentum of the rapidly moving rotor 20 is being delivered to the more slowly moving rotor 120 and the movement of rotor 20 will be substantially three times the movement of rotor 120. When the rotors reach the relative position shown in Figure 6, the speed of the two rotors is approximately equal. During the movement of rotor 20 from the position shown in Figure 6 to the position in which its piston 22b is upright, corresponding to the position of piston 122a in Figure 4, the movement of rotor 120 is substantially three times as great as that of rotor 20.

From this description, it will be seen that the impulse applied to a rotor by the explosion of the fuel charge is transmitted to the shaft but, when the force of the expanding fuel charge is substantially exhausted and it becomes necessary to free the shaft and rotor so as to avoid the rotor acting as a drag on the shaft, the momentum of the rotor, although not so great as that of the shaft, is not dissipated but is transferred to the previously stationary rotor (which is now released from the frame) and serves to give the latter rotor a start on its impulse-receiving movement so that by the time the expansion of the ignited fuel becomes effective the latter rotor is substantially synchronized with the shaft and is locked thereto and may deliver to the shaft the substantially full impulse from the expanded fuel. The transfer of momentum from one rotor to the other not only avoids waste of energy but also brings the decelerating rotor to a stop easily and avoids shocks which otherwise would be sustained if the movement of the decelerating rotor were arrested by mechanical means as distinguished from the elastic magnetic means.

Each time a rotor is subjected to the attraction of a different group of magnets, there will be a position just prior to the end of its deceleration or acceleration, as the case may be, when the south poles of the cooperating magnets will be opposed and the north poles of the cooperating magnets will be opposed. This will expedite the final movement of the rotor into its temporary locked position, i. e. stationary with the frame or synchronized with the shaft.

It will be understood that under the conditions described the movements of the rotors tend to become continuous and the velocity of the shaft will increase to a point determined by the fuel charge and the capacity of the engine, when the velocity will continue substantially uniform under a given load.

Obviously, the number of moving parts is minimized and these parts are of simple construction and free of cams, pins, wedges, stop blocks, springs, etc. as have characterized rotary engines of the same general type.

It will be understood that the brushes will be mounted so as to be moved angularly about the shaft for a short distance to effect the best timing of the shifting of the magnetic circuits relative to the igniting of the fuel charge. Obviously the relative lengths of the collecting and insulation segments of the rings may be varied to secure desired results.

While the above description relates particularly to an internal combustion engine, it will be understood that the novel features described are adapted for use in a steam or compressed air engine or a Diesel type engine. Also, by positively actuating the shaft from an external source, the structure may be utilized as a pump or compressor and, instead of the fluid drawn in between the successive pistons furnishing a power impulse, such fluid will be delivered from the cylinder under pressure.

Other details of the structure may be modified substantially in other ways than indicated without departing from the spirit of the invention and the exclusive use of those modifications coming within the scope of the claims is contemplated.

What is claimed is:

1. In a rotary engine, a shaft member, a circular cylinder member surrounding the same, relatively movable pistons in the cylinder member, means temporarily locking the pistons to the shaft member and to the cylinder member respectively and alternately, the means for locking the pistons to at least one of the members comprising a periodically energized and deenergized electromagnet.

2. In a rotary engine, a shaft member, a circular cylinder surrounding the same, relatively movable pistons in the cylinder, periodically energized and deenergized electromagnetic means for temporarily locking the pistons to the power shaft and to the cylinder respectively and alternately.

3. In a rotary engine, a shaft member, a circular cylinder member surrounding the same, relatively movable pistons in the cylinder member, means temporarily locking the pistons to the shaft member and to the cylinder member respectively and alternately, the means for locking the pistons to at least one of the members comprising an electromagnet the circuit of which is closed and opened by the movement of the pistons to a predetermined angular position about the shaft and cylinder.

4. In a rotary internal combustion engine, a power shaft, a circular cylinder surrounding the same, relatively movable pistons therein, magnetic means for temporarily locking respective pistons to the shaft and cylinder, a fuel inlet to the cylinder between said pistons, and means for igniting the fuel controlled by the positioning of one of the pistons irrespective of the angular position of the shaft.

5. In a rotary internal combustion engine, a power shaft, a circular cylinder surrounding the same, relatively movable pistons therein, magnetic means for successively locking and releasing the pistons to the shaft and to the cylinder respectively and alternately, a fuel inlet port leading to the cylinder between the pistons, and a fuel ignition system, said port and ignition system being controlled by the positioning of the piston irrespective of the angular position of said shaft.

6. In a rotary internal combustion engine, a power shaft, a circular cylinder surrounding the same, two pistons movable separately in the cylinder, electromagnetic devices successively locking each of the pistons to the power shaft and to the cylinder respectively and alternately, a fuel inlet to said cylinder whereby a charge of fuel may be drawn into the cylinder between two pistons during their relative movement away from each other, means for igniting the charge, and timing means controlling said devices and effecting release of the piston locked to the power shaft prior to the release of the piston locked to the cylinder and effecting release of the latter-mentioned piston prior to the ignition of the fuel charge.

7. In a rotary internal combustion engine, a power shaft, a circular cylinder surrounding the same, two pistons movable separately in the cylinder, electromagnetic devices successively locking each of the pistons to the power shaft and to the cylinder respectively and alternately, a port for admitting fuel to a space between the pistons during a portion of their relative movement away from each other when adjacent the port, means for igniting the charge, and timing means controlling said devices and effecting release of the piston locked to the power shaft prior to the release of the piston locked to the cylinder and effecting release of the latter-mentioned piston prior to the ignition of the fuel charge.

8. In an internal combustion rotary engine, a power shaft, a circular cylinder surrounding the same, a forward piston and a rear piston in the cylinder, electromagnetic devices temporarily locking the forward piston to the cylinder and the rear piston to the shaft during a portion of the cycle of operation, a fuel intake to the cylinder between the pistons when so locked and spaced substantially from the forward piston, a fuel ignition system, magnet-current-controlling means for releasing the rear piston from the shaft after it passes the intake and as the compression of the fuel between the pistons reaches the desired pressure, and means for releasing the forward piston from the cylinder before said compression stops the rear piston so that momentum of the rear piston will be transferred to the forward piston through the compressed fuel and prior to ignition of the fuel.

9. An engine as described in claim 8 which includes electromagnetic means locking the forward piston to the shaft and locking the rear piston to the cylinder after the forward piston has received momentum from the rear piston, the ignition being synchronized with the latter-mentioned means to cause combustion of the fuel to propel the forward piston after the latter-mentioned locking has occurred.

10. In an internal combustion rotary engine, a power shaft, a circular cylinder surrounding the same, four pistons movable therein and arranged in pairs, the pistons of each pair being spaced apart but rigid with each other, periodically energized electromagnetic means for locking each pair of pistons to the cylinder and shaft alternately, a fuel intake, a fuel exhaust, an ignition system and timing means controlling said locking means so that the pistons are locked simultaneously to the cylinder and shaft alternately once during each rotation of the shaft and the intake and exhaust and ignition system function twice during each rotation of the shaft.

11. In an internal combustion rotary engine, a power shaft, a circular cylinder surrounding the same, a pair of pistons movable relative to each other in the cylinder, a fuel intake to the cylinder, a fuel exhaust from the cylinder, an igniter for fuel in the cylinder, and electromagnetic means for locking the pistons to the cylinder and shaft respectively and alternately at predetermined points in the movement of the pistons through the cylinder, and means controlled by the positions of the pistons so that rotation of the pistons by the ignition of the fuel charge and its subsequent expansion effects compression of the ensuing fuel charge and continued rotation of the shaft and discharge of the burnt fuel.

12. In an internal combustion rotary engine, a power shaft, a circular cylinder surrounding the same, a pair of pistons in the cylinder, electromagnetic means for locking the pistons individually to the cylinder and shaft alternately, timing means controlling the electromagnetic circuit so that the rear piston is locked to the shaft and moves towards the forward piston while the latter is locked to the cylinder and forms a part thereof, a fuel intake to the cylinder between the pistons and spaced substantially from the forward piston when it is locked as described, the timing means causing said electromagnetic circuit to release the rear piston from the shaft as the compression in the cylinder between the pistons reaches the desired pressure and causing the electromagnetic circuit to release the forward piston from the cylinder before said compression stops the rear piston so that the forward piston will receive the momentum of the rear piston, and causing the electromagnetic circuit to lock the rear piston to the cylinder and the forward piston to the shaft as the momentum of the two pistons approaches equalization, and means for igniting the charge synchronously with the latter-mentioned locking of the pistons to the cylinder and shaft respectively, said timing means effecting energization of the electromagnetic circuit during the approach of the pistons to their locking positions, whereby the electromagnetic circuit contributes to the movement of the pistons through the cylinder.

13. In an internal combustion rotary engine, a power shaft, a circular cylinder surrounding the same, a pair of pistons in the cylinder, electromagnetic means for locking the pistons individually to the cylinder and shaft alternately, timing devices controlling said means so that a piston may be locked to the shaft and moved towards another piston while the latter is locked to the stationary cylinder and forms a part thereof, a fuel intake to the cylinder between the pistons and spaced substantially from the forward piston when it is locked as described, the timing devices causing said means to release the rear piston from the shaft as the compression in the cylinder between the pistons reaches the desired pressure, and causing said means to release the forward piston from the cylinder before the rear piston is locked to the cylinder so that the forward piston will receive momentum of the rear piston, and causing said means to lock the rear piston to the cylinder and the forward piston to the shaft as the momentum of the two pistons approaches equalization, and means for igniting the charge synchronously with the latter-mentioned locking of the pistons to the cylinder and shaft respectively.

14. In a rotary internal combustion engine, a power shaft, a pair of rotors thereon, a piston on each rotor, a stationary frame including a circular cylinder surrounding the shaft and receiving the pistons, individual electromagnets for locking the rotors to the cylinder and to the power shaft selectively, the piston on the shaft-locked rotor moving towards the piston on the cylinder-locked rotor during a portion of the engine cycle to compress a fuel charge between the pistons, collector rings on the rotors and shaft, brushes on the frame associated with said rings, each ring having alternate conducting and insulating segments arranged about the axis of the rotors and shaft, the conducting segments being electrically connected to said magnets and the segments of the collector rings of one rotor being staggered in part circumferentially of the shaft with the conducting segments of the collector rings of the other rotor so that one rotor is locked to the shaft during the time that the other rotor is locked to the cylinder and the electro-magnets locking one rotor to the shaft are energized as the compression in the cylinder reaches the desired pressure and the electromagnets holding the other rotor to the cylinder are deenergized before said compression stops the rear piston, whereby the forward piston will receive the momentum or velocity of the rear piston, and the electromagnet locking the forward piston to the power shaft and the rear piston to the cylinder will be energized as the momentum or velocity of the two pistons, and their rotors, is equalized, there being means for igniting the fuel charge when the desired compression is attained.

15. In a rotary engine, a power shaft, a pair of rotors thereon, pistons on each rotor, a circular cylinder surrounding the shaft and receiving the pistons, magnetic means for temporarily securing individual pistons to the shaft and cylinder respectively, ports for admitting fluid to the cylinder and for exhausting fluid from the cylinder, the charging and compression of the fluid being effected by relative movement of the rotors and their pistons, the momentum of the more rapidly moving rotor being transferred to the other rotor through the admitted fluid compressed between the pistons and by the expansion of the fluid when ignited, and the momentum of the more rapidly moving rotor being transferred to the power shaft.

16. An engine as described in claim 15 in which the magnetic means effect in part the relative movement of the rotors.

17. In an engine, a shaft, a circular cylinder surrounding the same, rotors on said shaft with individual pistons in said cylinder, said rotors being movable relative to the shaft, the cylinder and each other, electromagnetic devices intermittently securing the rotors to the cylinder and shaft respectively, there being an inlet and an outlet to said cylinder, and means controlling the circuits for said devices and correlated with said rotors so that the relative movement of the rotors due to the intermittent securing of the same to the shaft and to the cylinder causes the space between their respective pistons to be subjected alternately to subatmospheric pressure and to super-atmospheric pressure to draw fluid through said inlet into said cylinder and to exhaust fluid from the cylinder through said outlet.

18. An engine as described in claim 17 which includes means for igniting the fluid in the cylinder when it is subjected to superatmospheric pressure while one of the rotors is secured to the cylinder and the other rotor is secured to the shaft whereby the latter-mentioned rotor and the shaft are propelled by the expansion of the fluid.

19. In an internal combustion rotary engine, a power shaft, a circular cylinder surrounding the same, a pair of pistons in the cylinder, electromagnetic means for locking the pistons individually to the cylinder and shaft alternately, timing means controlling the electromagnetic circuit so that the rear piston is locked to the shaft and moves towards the forward piston while the latter is locked to the cylinder and forms a part thereof, a fuel intake to the cylinder between the pistons and spaced substantially from the forward piston when it is locked as described, the timing means causing said electromagnetic circuit to release the rear piston from the shaft as the compression in the cylinder between the pistons reaches the desired pressure and causing the electromagnetic circuit to release the forward piston from the cylinder before said compression stops the rear piston so that the forward piston will receive the momentum of the rear piston, and causing the electromagnetic circuit to lock the rear piston to the cylinder and the forward piston to the shaft as the momentum of the two pistons approaches equalization, and means for igniting the charge synchronously with the latter-mentioned locking of the pistons to the cylinder and shaft respectively.

20. In a rotary engine, a power shaft, a pair of rotors thereon, pistons on each rotor, a circular cylinder surrounding the shaft and receiving the pistons, a port for admitting fluid to the cylinder between the piston of one rotor and a piston of the other rotor, a port for exhausting fluid from the cylinder between the other pistons of the rotors, the momentum of the more rapidly moving rotor being transferred to the other rotor through the fluid between the two first-mentioned pistons, and electromagnetic means supplementing the action of the fluid pressure on the more slowly moving piston.

21. In a pump, a circular housing, a shaft disposed axially of the housing, pistons movable in the housing about said axis and relative to each other, electromagnetic devices intermittently securing each piston to the housing and to the shaft respectively, there being an inlet and an outlet to said housing, and means controlling the circuits for said devices and correlated with said pistons so that the relative movement of the pistons due to the intermittent securing of the same to the shaft and to the housing causes the space between successive pistons to be subjected alternately to subatmospheric pressure and to super-atmospheric pressure to draw fluid through said inlet into the housing and to exhaust fluid from the housing through said outlet.

JOHN BRUCE STEWART.